3,193,824
AIRCRAFT LANDING SYSTEM
Josef Eitzenberger, 5 Am Kohlerweg, Oberursel, Taunus, and Hans Kuhl, Frankfurt am Main, Germany; said Kuhl assignor to said Eitzenberger
Filed Apr. 17, 1962, Ser. No. 188,072
1 Claim. (Cl. 343—7.9)

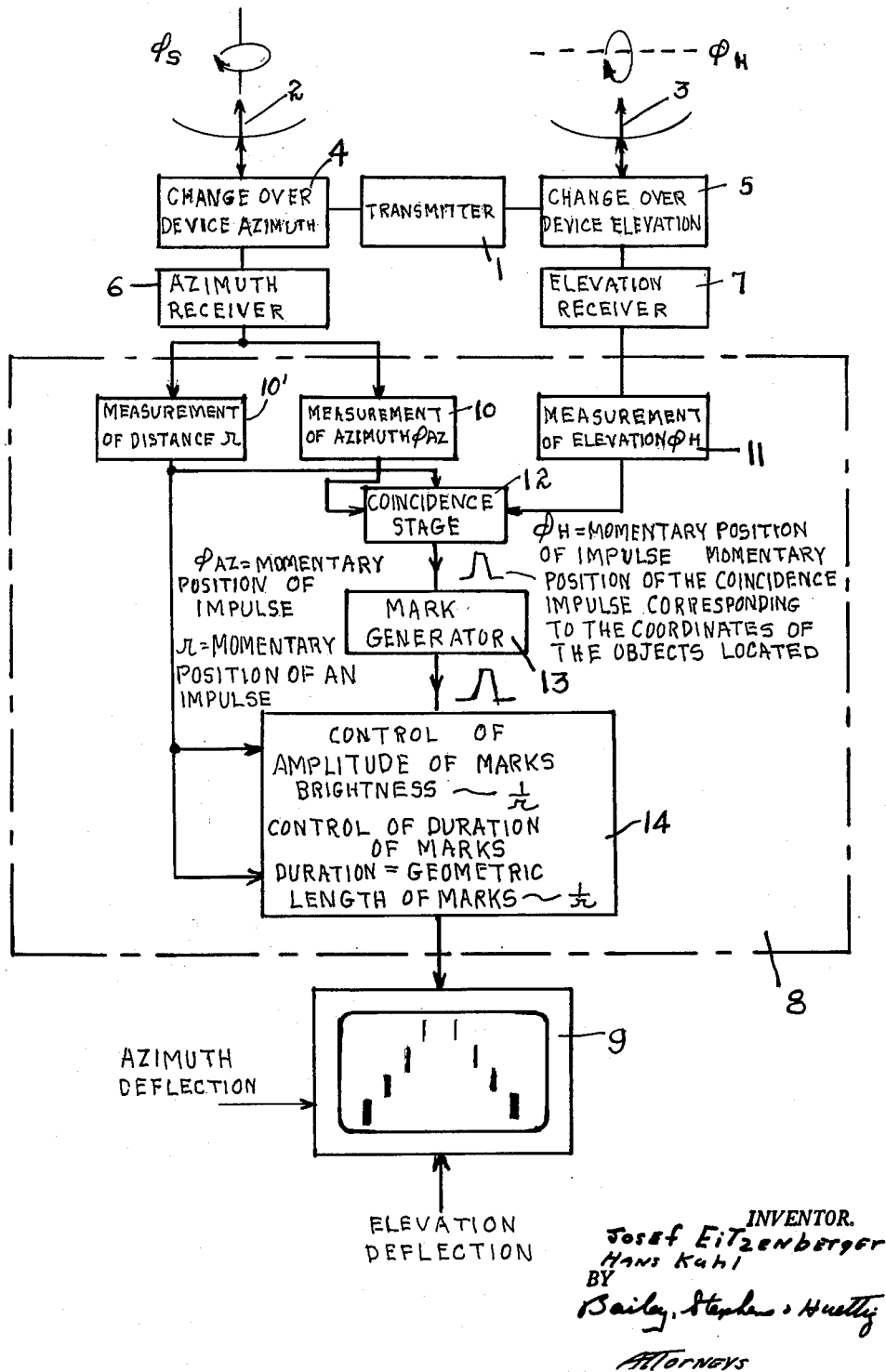

This invention relates to a system for facilitating the landing of aircraft in conditions of poor visibility.

A procedure has been proposed in which the runway boundary is irradiated with infra-red light and the image of such boundary is picked up by an infra-red spotter receiver on the aircraft and made visible to the aircraft pilot on an image screen. The advantage of this representation is that the runway appears to the pilot in a perspective corresponding to normal vision, but the procedure has the disadvantages of infra-red methods, such as considerable sensitivity to disturbances and reduced range.

A blind landing system has been proposed in which an image of the runway is recorded on an image screen by an aircraft-borne radar apparatus which produces images in dependence upon transmission times, in co-operation with relay stations (boundary beacons) which are disposed on the ground along the runway. However, the image provided by this procedure does not correspond to natural vision since the ordinates of the representation are determined by the momentary distance of the aircraft from the various boundary beacons.

According to the present invention there is provided a system for facilitating the landing of aircraft in conditions of poor visibility wherein two radar systems, one for elevation and one for azimuth, are arranged to scan the space sector containing the runway by means of maximum homing, to ascertain the position relative to an aircraft of active transmitters or responders or reflectors which bound the runway laterally, and wherein the radar systems are arranged to provide a perspective representation of the runway by light marks in a visualising apparatus on board the aircraft, the light marks depicting the position relative to the aircraft of the active transmitters, or responders or reflectors.

With this system the values found for azimuth and elevation may be applied to an image reproducer which indicates azimuth angles along the abscissa and elevation angles along the ordinate of a cartesian co-ordinate system. The image of the runway boundary beacons can therefore be reproduced on the image reproducer screen in a manner faithful to the respective angles, just as the pilot would see it with his own eyes.

If a number of the transmitters picked up in scanning have the same elevation angles or azimuth angles, the chance of receiving wrong images may be obviated by determining the distance of each transmitter from the aircraft, for instance, by measuring the propagation time, and by associating with one another, and showing on the image screen, only those azimuth and elevation values which are associated with the same distance.

With the present system, the measured values of distance between the aircraft and the various boundary beacons can be used further to improve the visual representation of the runway. To this end, the light spots on the image screen which symbolize the boundary beacons are varied in size or brightness in dependence upon the measured value of the distance, for instance, a measurement of propagation time. Advantageously, for instance, the light marks on the image screen can be recorded in the form of dashes, and the length and/or brightness thereof can be so controlled that parts of the runway which are relatively near appear as thicker and/or longer lines or dashes than parts of the runway which are relatively remote.

In order to enable the invention to be more readily understood, an embodiment of the blind landing procedure according to the invention will now be described in greater detail with reference to the accompanying diagrammatic drawing, which illustrates by way of example a block diagram of a radar circuit.

Referring now to the drawing impulses produced by a transmitter 1 of a radar apparatus on board an aircraft are radiated from two separate antenna systems 2 and 3. Each antenna system has a fan-like polar diagram so that a complete space sector is swept in a one-dimensional scanning movement. The directions of movement of the fans are so chosen that one fan determines the bearing angle $\varphi_S$ and the other determines the elevation angle $\varphi_H$ referred to a fixed co-ordinate system on the aircraft. The antennae 2 and 3 are periodically connected by change-over devices 4 and 5 to receivers 6 and 7 from which the received reflection pulses are supplied to a coincidence gate 8.

Associated measurement value pairs of azimuth angles and elevation angles are formed from the signals by simultaneous measurement of the distance from the aircraft to the reflectors on the ground in the gate 8, in order to separate out apparent reflectors behind the azimuth receiver channel and the elevation receiver channel. These measurement value pairs produce light marks in an image reproducer 9 and their representation is in cartesian co-ordinates, the azimuth angles $\varphi_S$ being used as abscissa and the elevation angles $\varphi_H$ being used as ordinates.

The available distance measured values used for the selection are also used to control the length and brightness of the light marks in inverse proportion to the distance. When the marks are so reproduced that their length extends in the ordinate direction, the impression on the image screen as the aircraft approaches the runway is the same as driving along a road lined with poplars.

These results are accomplished by feeding the series of groups of echo impulses from a beacon, which are derived from the azimuth receiver 6 to the azimuth measuring device 10 where they are evaluated for the determination of the azimuth $\varphi_{AZ}$ and to distance measuring device 10'. The series of groups of echo impulses from the same beacon, which are derived from the elevation receiver 7, are fed to the elevation measuring device 11 where they are evaluated for the determination of the elevation angle $\varphi_H$. The impulse series, in which the values of the distance, the azimuth and the elevation are determined by the momentary position or position in time of the impulse with respect to a zero position, are fed to coincidence stage 12 in which at the moment of a coincidence an impulse is generated. The momentary position of the coincidence impulse, which is repeated once for each scanning of the whole observed area, serves to release an impulse from the mark generator 13.

The impulse furnished from the generator gives through impulse converter 14 the location of the light point on the screen of the apparatus. An additional control by the location of several beacons follows based on the measurement of the distance values for these impulses, which are controlled so as to have their amplitudes varied inversely proportional to the distance, while the duration of the impulses is varied in inverse proportion to the distance. The amplitude of the marks serves to control the brightness of the marks on the screen. The length of the individual marks is varied by the duration of the impulses. Thus, the closer beacons are represented by relatively longer, dark marks near the edges of the screen while the most remote ones are represented by relatively shorter light marks near the center of the screen.

In other words, the screen is supplied with impulses whose position in time corresponds to the bearing angles at which the beacons are detected by the antenna and whose darkness and size are inversely proportional to the distances of the detected beacons.

Responders can be used instead of reflectors to mark the runway. Similarly, instead of an active transmitter in the aircraft being used, pulses from individual transmitters bounding the runway can be processed, in which event the received signals are processed in the aircraft exactly as hereinbefore described.

The term "beacon" as used herein is intended to include transmitters, responders or reflectors positioned along an airfield runway.

While we have described herein some embodiments of our invention, we wish it to be understood that we do not intend to limit ourselves thereby except within the scope of the claim hereto or hereinafter appended.

We claim:

A system for facilitating the landing of aircraft on a runway in conditions of poor visibility, comprising two receivers each having an antenna connected to it, transmitting means connected to both said antennas, said antennas being arranged to scan the space sector containing the runway in azimuth and elevation respectively to ascertain the position relative to an aircraft of beacons which bound the runway laterally, a screen, and means including coincidence means responsive to simultaneous receipt by both said antennas of signals from the same beacon to furnish a signal to said screen to produce thereon marks forming a perspective representation of the position of the beacons with respect to the aircraft, said mark producing means including means responsive to the time required for the travel of radar signals between each beacon and the antennas for evaluating simultaneously and one at a time the azimuth and elevation angles of each such beacon, said mark producing means further including means responsive to such evaluating means for varying the size and intensity of the marks for each beacon in inverse proportion to the distance of the aircraft from the beacon.

References Cited by the Examiner
UNITED STATES PATENTS

| | | | |
|---|---|---|---|
| 2,204,628 | 6/40 | Sorensen | 343—5 |
| 2,226,860 | 12/40 | Greig | 343—112 |
| 2,231,929 | 2/41 | Lyman | 343—16 |
| 2,279,246 | 4/42 | Podliasky et al. | 343—112 |
| 2,426,184 | 8/47 | Deloraine et al. | 343—108 |
| 2,426,218 | 8/47 | Hopgood | 343—18 X |
| 2,502,974 | 4/50 | McElhannon | 343—18 |
| 2,539,405 | 1/51 | Deloraine et al. | 343—108 X |
| 2,572,043 | 10/51 | McElhannon | 343—18 X |
| 2,713,161 | 7/55 | Fiske | 343—100.6 |
| 3,013,263 | 12/61 | Alexander et al. | 343—5 |

CHESTER L. JUSTUS, *Primary Examiner.*

KATHLEEN H. CLAFFY, *Examiner.*